R. HUFF.
FRICTION CLUTCH.
APPLICATION FILED APR. 27, 1907.

963,044.

Patented July 5, 1910.

Witnesses

Inventor
Russell Huff
by Foster, Freeman, Watson & Coit
Attorneys

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

FRICTION-CLUTCH.

963,044. Specification of Letters Patent. Patented July 5, 1910.

Application filed April 27, 1907. Serial No. 370,620.

*To all whom it may concern:*

Be it known that I, RUSSELL HUFF, a citizen of the United States, residing at Detroit, in the county of Wayne and State of Michigan, have invented certain new and useful Improvements in Friction-Clutches, of which the following is a specification.

The clutch herein claimed is an improvement upon that covered by the patent to Packard, 769,321, September 6, 1904, and was especially designed for use in automobiles, but is obviously adapted for other uses, and therefore I do not intend to limit myself to its use in automobiles.

Figure 2:
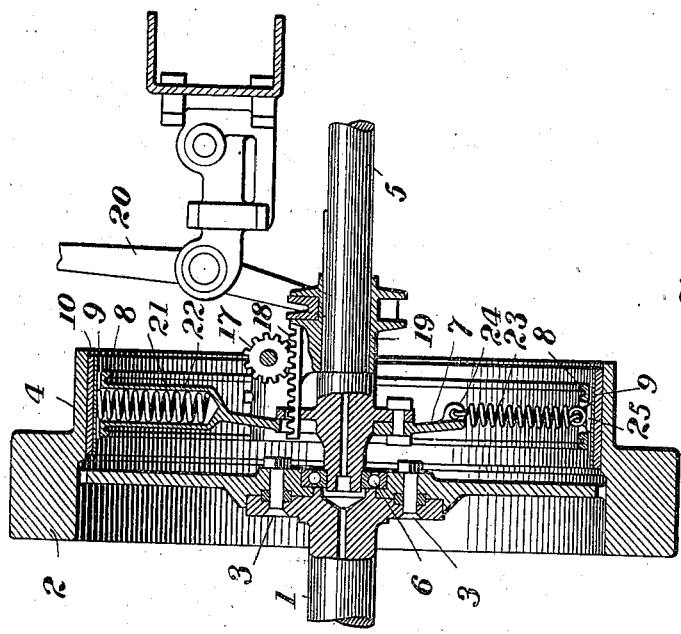
Figure 1:
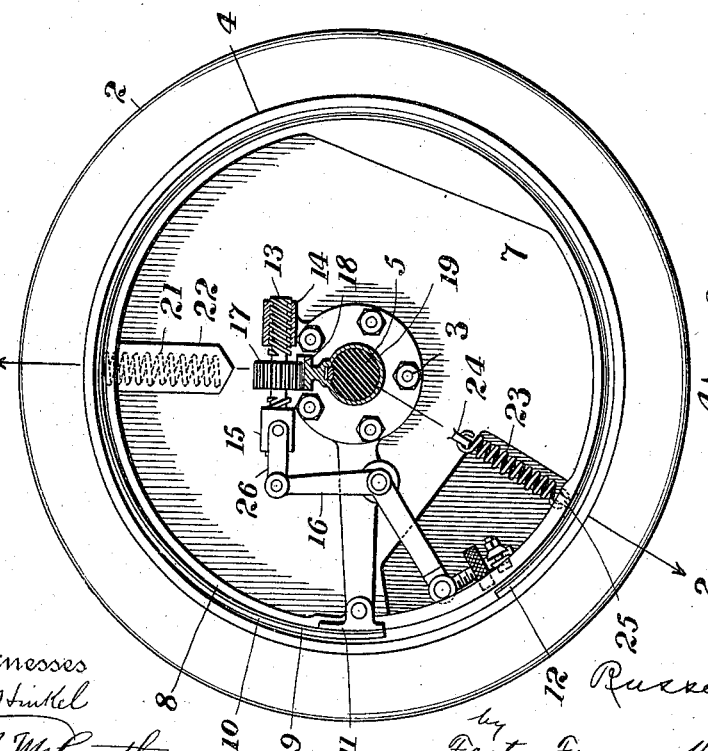
Figure 3:
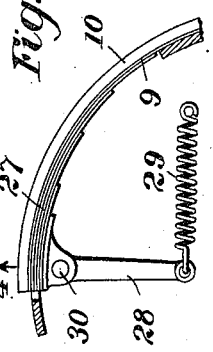

In the accompanying drawings—Figure 1 is a face view of the clutch; Fig. 2 is a side view of the clutch and connections partly in section taken upon the line 2—2 Fig. 1; Fig. 3 is a face view of a modification; and Fig. 4 is a side view of the same modification partly in section upon the line 4—4 Fig. 3.

Referring to the drawings, 1 indicates a shaft which may be constantly rotating and which is connected to a source of power. The part 2 is a pulley or fly wheel rigidly attached by means of bolts 3 to the shaft 1 and rotating therewith. The pulley or fly wheel 2 has an extended flange 4 which forms one of the clutch members. The shaft 5, having a ball bearing support 6 in the end of the shaft 1 and in the hub of the pulley or fly wheel 2, carries the other clutch member. This second clutch member may be termed the movable clutch member since it includes a ring-shaped member or split ring which may be expanded so as to contact with the inner surface of the flange 4, and by friction clutch the parts together. This member includes a web 7 attached to a flange on the shaft 5 by bolts, and carrying at its periphery a cylindrical flange 8 which serves as a support for the brake band of the clutch, as in Patent No. 769,321, above mentioned. The brake band is made up of the steel band or split ring 9 and the coating 10 of leather or equivalent material, and is rigidly attached to the cylindrical support 8 at the end marked 11. (See Fig. 1.) The opposite end 12 of the brake band is movable in reference to the support 8 and has means mounted thereon for moving it as described in the patent above mentioned, including the short shaft 13 with the oppositely screw-threaded ends fitting in the fixed bushing 14 and the movable bushing 15 together with the rock-shaft connection 16 between the movable end and the movable bushing. The short shaft 13 is rotated by means of the pinion 17 and rack 18, the rack 18 being carried by the sleeve 19 slidably keyed to the shaft 5. The sleeve 19 is moved lengthwise of the shaft by means of the pivoted lever 20 which may be a foot lever of an automobile.

The spring 21 is mounted in a housing 22 in the web of the support 8, and is under compression, one end bearing against the inner side of the brake-band 9 and tending to force it outwardly into contact with the other clutch member 4. The tension spring 23 is connected at 24 to the web 7 of the support 8, and at 25 it is connected to the steel band 9 of the movable clutch member. It will be apparent that the spring 21 tends to force the part of the movable clutch member opposite to it into contact with the fixed clutch member 4, while the spring 23 tends to draw the part of the movable clutch member to which it is attached away from the fixed clutch member and into contact with the support 8.

Figure 4:
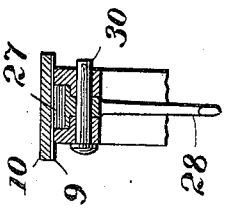

In the modification shown in Figs. 3 and 4, a leaf spring 27 instead of a coiled spring 21 is shown, and it is made up of several layers of thin metal, the layers being progressively of different length so as to more effectually distribute the strain of the operating lever. This leaf spring is placed at the fixed or anchored end of the band 9—10 and it is attached to and operated by the arm 28 pivoted at 30 and having attached to its other end the tension spring 29. The spring 29 will constantly press the band 10 outwardly and constantly hold it in frictional engagement with the surface of its coöperating member 4. The action of springs 27 and 29 is thus the same as the action of spring 21, shown in Fig. 1.

The operation of the device is believed to be obvious from the above description. The brake band or movable clutch member is drawn inward into contact with the support 8 and out of contact with the clutch member 4 or moves outward into contact with the clutch member 4 according to the direction in which the shaft 13 rotates. The bushing 15 is moved by the shaft 13 and through link 26 and elbow lever 16 moves the free end of the movable clutch member. The two springs 21 and 23 are added to make the movable clutch member 9—10 contact with the fixed member 4, first near the end which is fixed to the support 8. It has been found that in constructions similar to that shown in Patent 769,321 the free end of the movable clutch member is liable to come in contact with the fixed member first when the entire remaining surface of the leather is brought into contact with a violent slam causing a jerk at starting. The use of the two springs above described entirely overcomes this and by commencing the contact near the fixed end the clutching action may be allowed to increase gradually around the circumference and thus produce a "sweeter" engagement, avoiding jars.

Having thus described my invention, what I claim is—

1. In a device of the class described in combination, a cylindrical friction surface, a split ring adapted to engage said surface, one end of said ring being anchored and the other end movable to engage said surface, and means adjacent the anchored end of said ring to yieldingly press the same against said surface, substantially as described.

2. In a device of the class described in combination, a cylindrical friction surface, a split ring adapted to engage said surface, one end of said ring being anchored and the other end movable to engage said surface, means adjacent the anchored end of said ring to yieldingly press the same against said surface, and means adjacent the movable end of said ring to yieldingly withdraw the same from said surface, substantially as described.

3. In a device of the class described in combination, a cylindrical friction surface, a split ring adapted to engage said surface, one end of said ring being anchored and the other end movable to engage said surface, and means adjacent the movable end of the split ring tending to withdraw it from contact with the said friction surface and for permitting the portion adjacent the anchored end to remain in contact with said surface, substantially as described.

4. In a device of the class described in combination, a cylindrical friction surface, a split ring adapted to engage said surface, one end of said ring being anchored and the other end movable to engage said surface, and a spring under compression bearing upon a portion of the split ring near the anchored end pressing the same yieldingly against the friction surface and a spring under tension attached to the split ring near its free end tending to withdraw the same from the friction surface, substantially as described.

5. In a split ring clutch of the class described, in combination means adjacent one end thereof tending normally to expand a portion of the ring, means adjacent the other end tending normally to contract another portion thereof and means for operating the clutch, substantially as described.

6. In a split ring clutch of the class described, in combination means for expanding and contracting the split ring member, and means for causing the anchored end of the split ring to engage the other member of the clutch first, substantially as described.

7. In a clutch, the combination with the outer member thereof, and the inner member consisting of an expansible ring or band, of means for expanding said band, and means whereby the part of said band adjacent the anchoring point engages the outer member before the remainder of said band when the band is expanded, substantially as described.

8. In a clutch, the combination with the outer member thereof and the inner member consisting of an expansible ring, said ring being anchored at one point and having a movable end, of means for expanding said ring, and means whereby, when the ring is expanded, the portion thereof adjacent the anchoring point engages the outer member first, substantially as described.

9. In a clutch, the combination with the outer member thereof, and the inner member consisting of an expansible split ring anchored at one end, of means for expanding the inner member, a spring adjacent the anchored end for outwardly pressing said ring and a spring adjacent the movable end for withholding the latter.

10. In a device of the class described in combination, a cylindrical friction surface, a split ring adapted to engage said surface, means adjacent one end of said ring yieldingly pressing the same against the said surface, means adjacent the other end of the ring yieldingly withdrawing the same from said surface, and positive means for separating the ends of the split ring to expand it against the said surface.

11. In a clutch in combination, driving and driven members, one of said members being provided with a friction surface and the other member provided with a band coöperating with the friction surface, one end of said band being anchored and the other movable, and means for insuring that the anchored end of said band engages the friction surface first.

In testimony whereof I affix my signature in presence of two witnesses.

RUSSELL HUFF.

Witnesses:
ALLEN LOOMIS,
MARK C. TAYLOR.